United States Patent
Mallette

(12) United States Patent (10) Patent No.: US 6,727,506 B2
Mallette (45) Date of Patent: Apr. 27, 2004

(54) METHOD AND APPARATUS FOR A RADIATION MONITORING SYSTEM

(76) Inventor: Malcolm C. Mallette, 7272 N. Pennsylvania St., Indianapolis, IN (US) 46240

( * ) Notice: Subject to any disclaimer, the term of this patent is extended or adjusted under 35 U.S.C. 154(b) by 60 days.

(21) Appl. No.: 10/104,622

(22) Filed: Mar. 22, 2002

(65) Prior Publication Data

US 2003/0178575 A1 Sep. 25, 2003

(51) Int. Cl.[7] .................................................. G01T 1/00
(52) U.S. Cl. ..................... 250/394; 250/336.1
(58) Field of Search ................................ 250/301, 302, 250/394, 336.1

(56) References Cited

U.S. PATENT DOCUMENTS

| | | | | |
|---|---|---|---|---|
| 5,330,142 A | * | 7/1994 | Gnau, III | 248/124.1 |
| 5,679,956 A | * | 10/1997 | Johnston | 250/357.1 |
| 5,705,818 A | * | 1/1998 | Kelbel et al. | 250/361 R |
| 2003/0065485 A1 | * | 4/2003 | Zerwekh et al. | 702/188 |

FOREIGN PATENT DOCUMENTS

DE 19711124 A1 * 11/1997 ............. G01T/1/20

* cited by examiner

Primary Examiner—David Porta
Assistant Examiner—Christine Sung
(74) Attorney, Agent, or Firm—Krieg DeVault Lundy LLP

(57) ABSTRACT

A radiation monitoring system for detecting levels of radiation emitted from moving objects traveling at a wide range of speeds, including the high speeds normally encountered with vehicles traveling on highways, interstates, thoroughfares, railroads and conveyors. At least two and preferably three ionizing radiation detectors are employed, spaced apart in series along the direction of travel of the moving object or vehicle. The object or vehicle is monitored for radioactivity and the results are transmitted and processed at a central location. The individual results from each detector for a particular object or vehicle are summed and averaged over the number of detectors used thereby clearly distinguishing the fluctuating background radiation detected at each detector from the consistent high levels of radiation detected from those moving objects or vehicles measured emitting radiation. The results are cooperatively linked by an identification system such as a web cam or other photographic device which obtains visual identification of the objects and vehicles emitting the abnormally high levels of radiation detected.

21 Claims, 6 Drawing Sheets

METHOD AND APPARATUS FOR A RADIATION MONITORING SYSTEM

BACKGROUND OF THE INVENTION

The present invention relates to the detection of ionizing radiation, particularly to a method and apparatus for detecting ionizing radiation and moving sources, and more particularly to a method and apparatus for detecting high levels of ionizing radiation emitted from vehicles moving at high speeds along public roadways.

The problem of detecting moving objects that emit ionizing radiation has become significant. Scrap metal moving into scrap yards and steel mills must not contain significant radioactive contamination. The result of a truckload, or railcar load of scrap metal with radioactive contamination moving into a scrap yard could be the decontamination of the yard at great cost. The result of a contaminated load of scrap metal moving into a steel mill could be the decontamination of the mill. High decontamination costs have been encountered in such situations. The scrap metal, with the hidden radioactive contamination, may be moving into the yard or mill by truck, by railcar or by conveyor belt.

Prior art for monitoring ionizing radiation contamination in the loads of trucks and train cars for such purposes is well known, such as in U.S. Pat. Nos. 5,705,818 and 5,679,956. However, in this prior art, the preference is that the vehicle not move more than five or six miles per hour, as higher speeds decrease the sensitivity of the detection system. Thus, these systems are inherently impractical for monitoring vehicles when on public roads or railways or objects on a conveyor moving at moderate or full speed. It is therefore highly desirable to provide a new and improved radiation monitoring system.

Another prior art system can detect ionizing radiation in vehicles moving nearly 19 miles per hour by using an adaptive filter method. Such method uses at least three separate detectors, and data from a reading off of a vehicle from each detector is compared to a reading of background radiation, and only if all three detectors detect sufficiently high levels of radiation is an alarm sounded. In this way, false alarms are minimized. However, such a system is limited as it still is not practical for vehicles moving at highway speeds or on interstates moving at interstate speeds. Additionally, such a system may be susceptible to false negative readings in the event one of the detectors should have detected a sufficiently high level of radiation to trip an alarm but did not, causing the system to fail to sound an alarm.

The need for monitoring high levels of ionizing radiation from vehicles traveling at speeds in excess of 19 miles an hour as well as at lower speeds is clear in the wake of the Sep. 11, 2001 terrorist attacks in New York City and the increasing threat around the world from terrorist groups. Terrorists, such as World Trade Center attack suspect Osama bin Laden, claim to have nuclear and chemical weapons, according to accounts published in Pakistani newspapers and other Middle East news sources. U.S. officials have stated that terrorists are trying to acquire nuclear materials and weapons. Thus, there is the possibility that a terrorist could surround a car bomb with dangerous radioactive material. Under those circumstances, it is necessary to explore the question of whether or not authorities can detect vehicles carrying radioactive sources.

Vehicles cannot be regularly stopped and inspected with a handheld detection device because interstate highway traffic would be snarled, the program would require a large number of inspectors and police to back them up, and a terrorist could avoid the obvious roadblock by using an alternate route. An effective system must be inexpensive, detect radioactive material in a vehicle, identify the vehicle so that it can be stopped by police, avoid slowing down traffic to a crawl, and be so inconspicuous that a terrorist will not notice it and circumvent the system by using a secondary road. Therefore, it is highly desirable to provide a new and improved radiation monitoring system capable of regularly taking accurate readings above 19 miles per hour and from vehicles moving at a wide range of speeds including top speeds on highways, interstates and thoroughfares. It is also highly desirable to provide a new and improved radiation monitoring system that can provide visual identification of a vehicle corresponding to the detector reading therefrom. It is further highly desirable to provide a new and improved radiation monitoring system that is inconspicuous at least until such time as detection and identification may be made.

Prior art systems employ different means and methods for taking into account and compensating for background radiation levels as well as the natural shielding effect of most vehicles as they pass through the scanning area of the radiation detector. However, to take advantage of such means and methods requires additional skill and know-how for computing the specific relationships of timed readings and generating algorithms and other formulas and methods for arriving at accurate measurement results. Furthermore, each such means or method has an impact on the sensitivity of the system that may be used. Therefore, it is highly desirable to provide a new and improved radiation monitoring system that uses a simple yet unique method for arriving at accurate radiation detection results despite sensitivity considerations caused by readings generated from naturally occurring radioactive material and other background radiation sources. It is also highly desirable to provide a new and improved radiation monitoring system that uses the background readings detected in a way that affirmatively differentiates high level readings from materials carried by a vehicle traveling at high speed. It is further highly desirable to provide a new and improved radiation monitoring system that can monitor radiation with a high degree of sensitivity without concern of anomalous background radiation sources.

Finally, it is highly desirable to provide a new and improved radiation monitoring system having all of the above identified features.

SUMMARY OF THE INVENTION

It is therefore an object of the invention to provide a new and improved radiation monitoring system.

It is also an object of the invention to provide a new and improved radiation monitoring system capable of regularly taking accurate readings above 19 miles per hour and from vehicles moving at a wide range of speeds including top speeds on highways, interstates and thoroughfares.

It is an object of the invention to provide a new and improved radiation monitoring system that can provide visual identification of a vehicle corresponding to the detector reading therefrom.

It is also an object of the invention to provide a new and improved radiation monitoring system that is inconspicuous at least until such time as detection and identification may be made.

It is an object of the invention to provide a new and improved radiation monitoring system that uses a simple yet unique method for arriving at accurate radiation detection results despite sensitivity considerations caused by readings generated from naturally occurring radioactive material and other background radiation sources.

It is also an object of the invention to provide a new and improved radiation monitoring system that uses the background readings detected in a way that affirmatively differentiates high level readings from materials carried by a vehicle traveling at high speed.

It is an object of the invention to provide a new and improved radiation monitoring system that can monitor radiation with a high degree of sensitivity without concern of anomalous background radiation sources.

Finally, it is an object of the invention to provide a new and improved radiation monitoring system having all of the above identified features.

In the broader aspects of the invention there is provided a radiation monitoring system for detecting levels of radiation emitted from moving objects traveling at a wide range of speeds, including the high speeds normally encountered with vehicles traveling on highways, interstates, thoroughfares, railroads and conveyors. At least two and preferably three or more ionizing radiation detectors are employed, spaced apart in series along the direction of travel of the moving object or vehicle. The object or vehicle is monitored for radioactivity and the results are transmitted and processed at a central location. The individual results from each detector for a particular object or vehicle are summed and averaged over the number of detectors used clearly distinguishing the fluctuating background radiation detected at each detector from the consistent high levels of radiation detected from those moving objects or vehicles measured and are cooperatively linked by an identification system such as a web cam or other photographic device which obtains visual identification of the objects and vehicles emitting the abnormally high levels of radiation detected.

BRIEF DESCRIPTION OF THE DRAWINGS

The above mentioned and other features and objects of the invention and the manner of obtaining them will be more apparent and the invention itself will be better understood by reference to the following description of an embodiment of the invention taken in conjunction with the accompanying drawings wherein.

DETAILED DESCRIPTION OF A SPECIFIC EMBODIMENT

Figure 1:
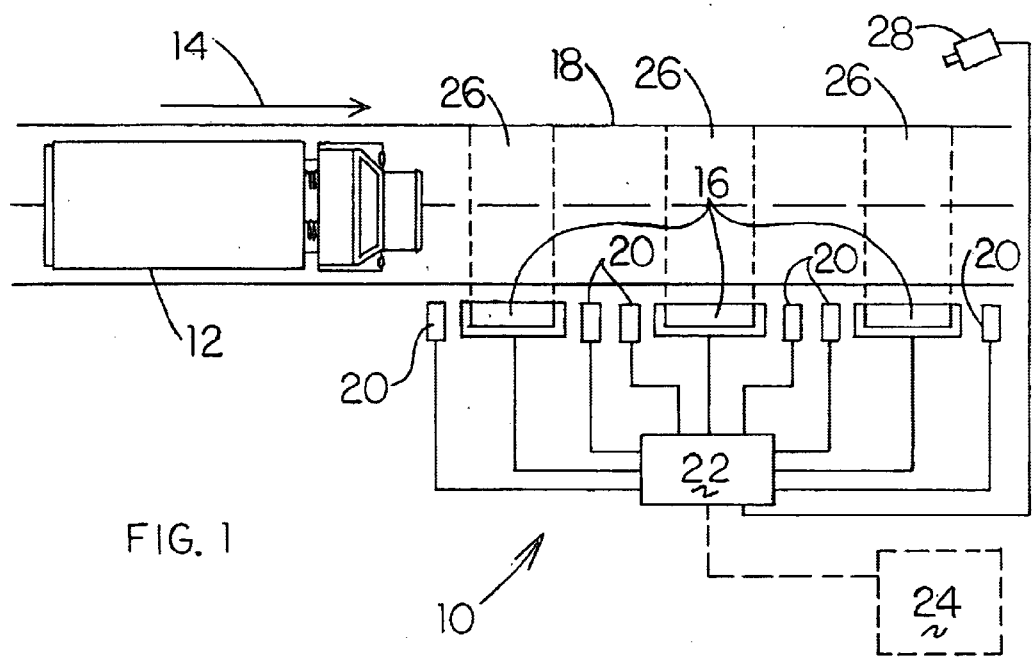
FIG. 1 is a top plan view of a radiation monitoring system according to the present invention.
Figure 2:
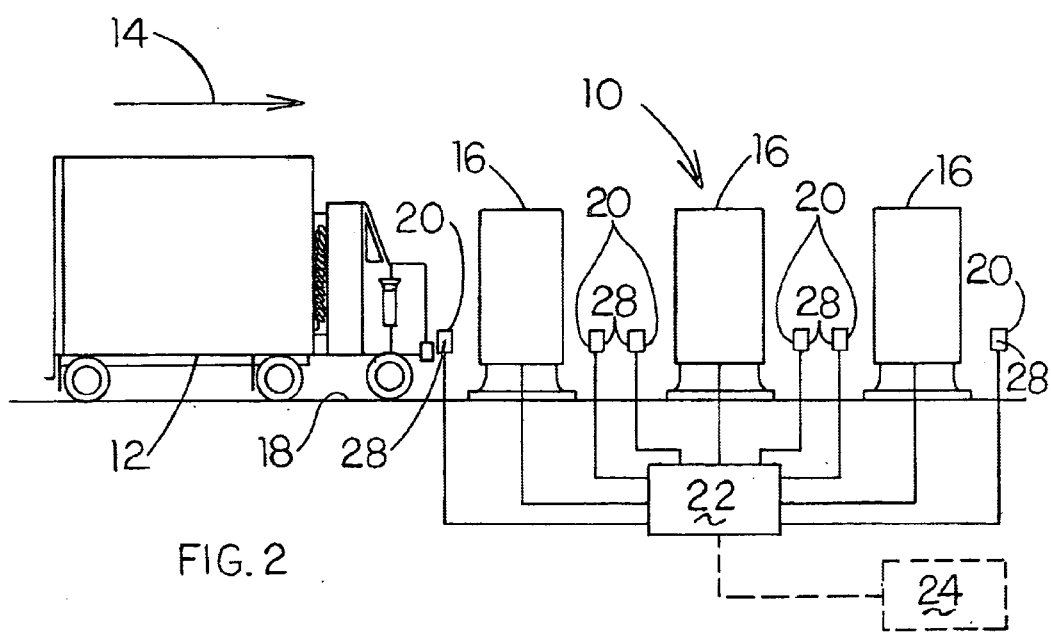
FIG. 2 is a cross-sectional view of the system of FIG. 1.
Figure 3:
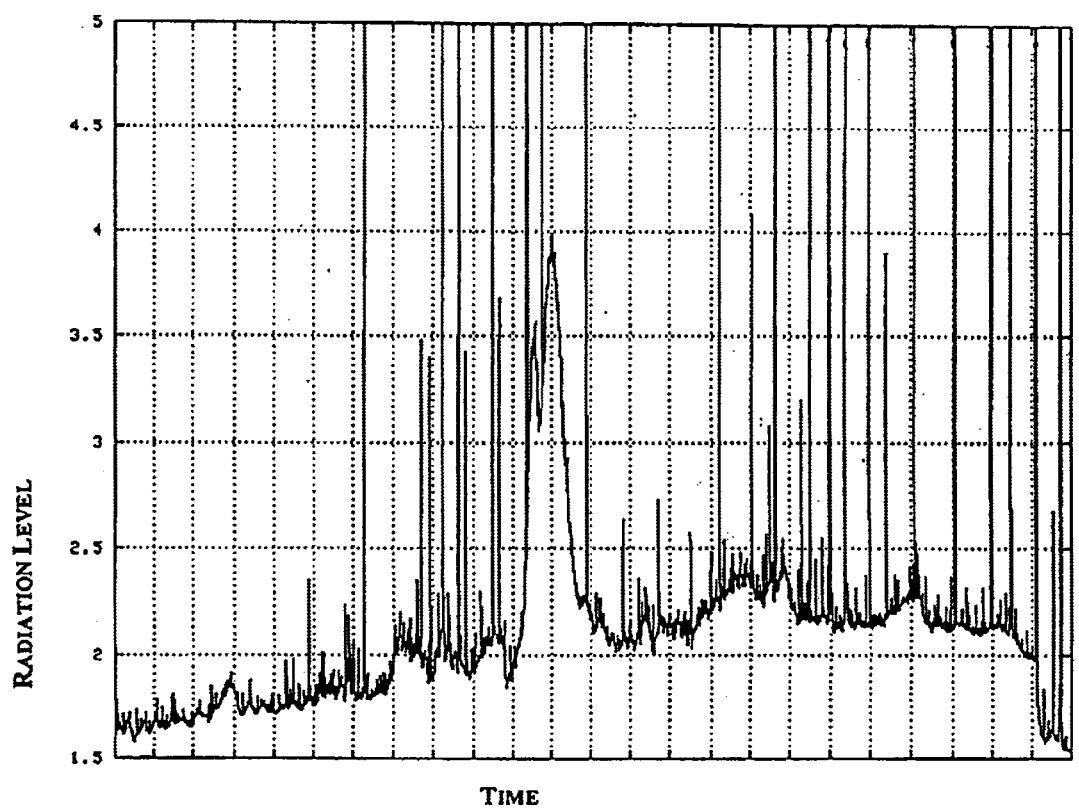
FIG. 3 is a diagrammatic readout of radiation levels over time detected by a first radiation detector in the radiation monitoring system of the present invention.
Figure 4:
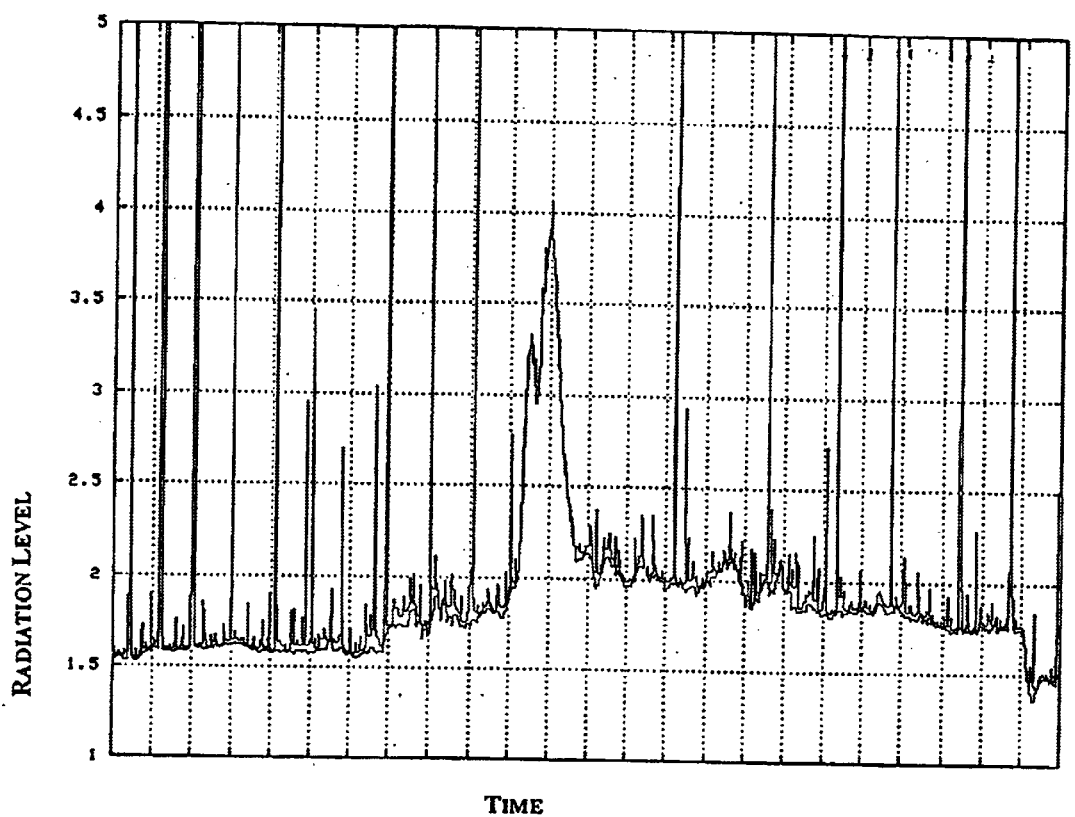
FIG. 4 is a diagrammatic readout of radiation levels over time detected by a second radiation detector in the radiation monitoring system of the present invention.
Figure 5:
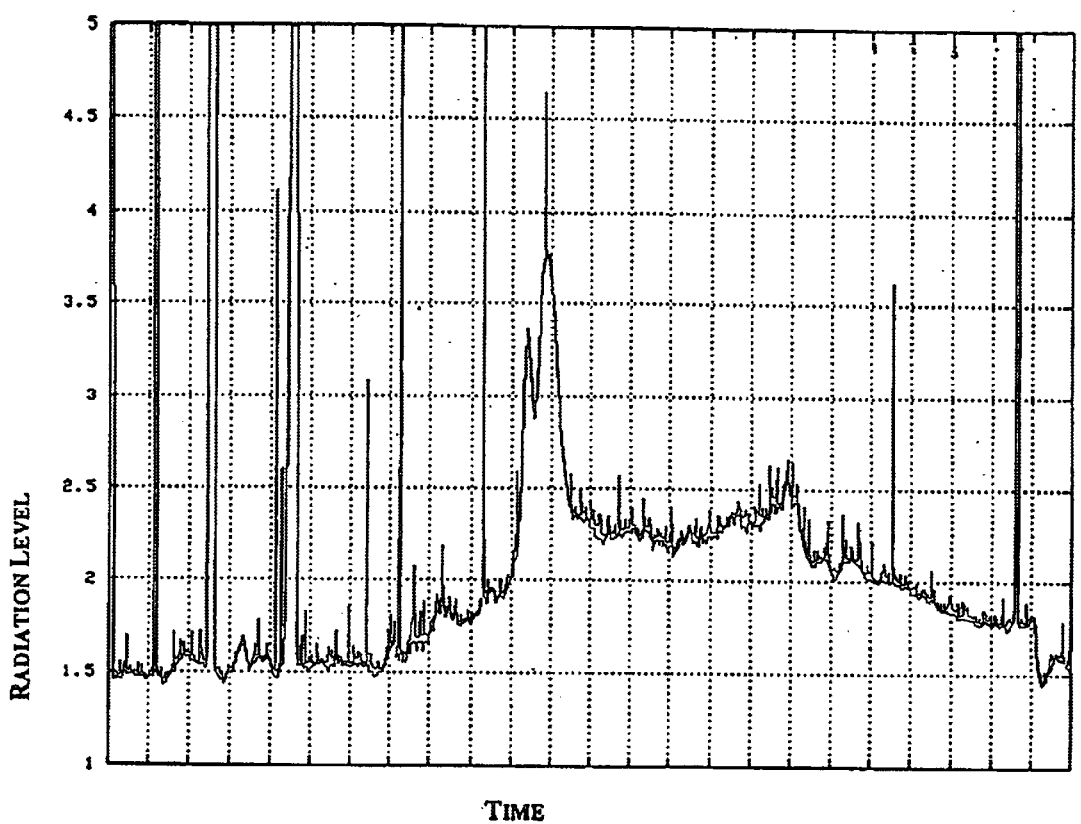
FIG. 5 is a diagrammatic readout of radiation levels over time detected by a third radiation detector in the radiation monitoring system of the present invention.
Figure 6:
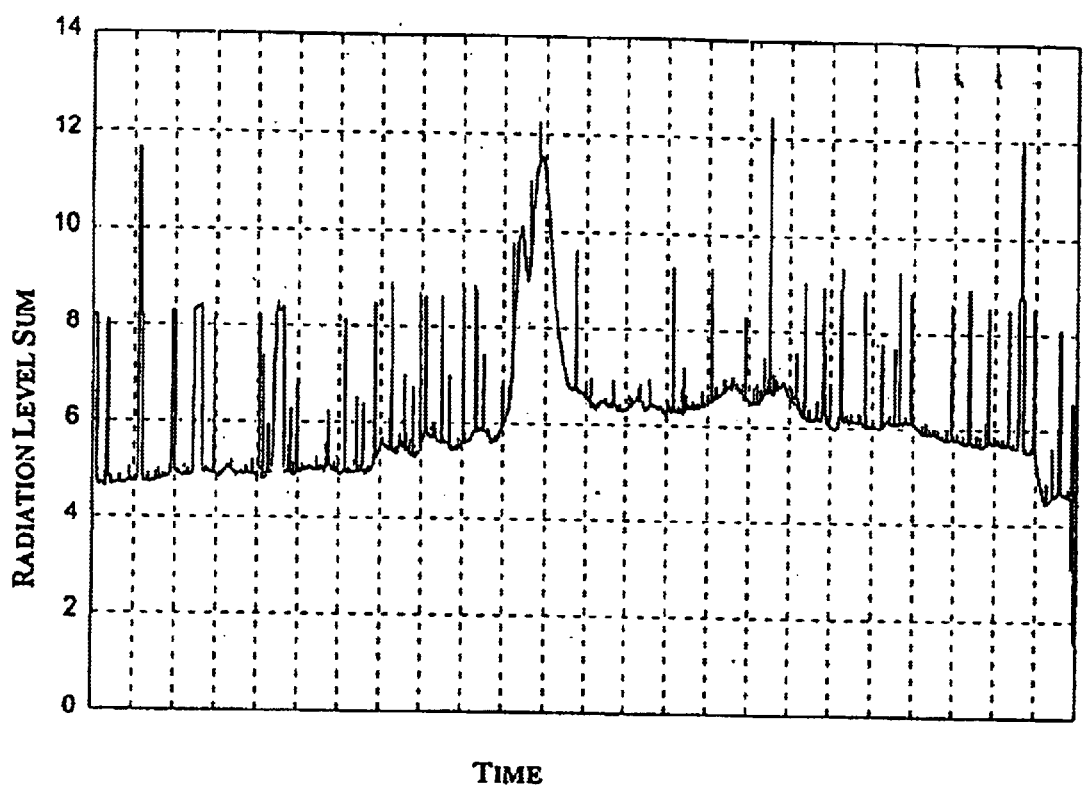
FIG. 6 is a diagrammatic readout of the sum of the radiation level readings for corresponding time intervals taken from each of the first, second, and third radiation detectors of the radiation monitoring system of the present invention.
Figure 7:
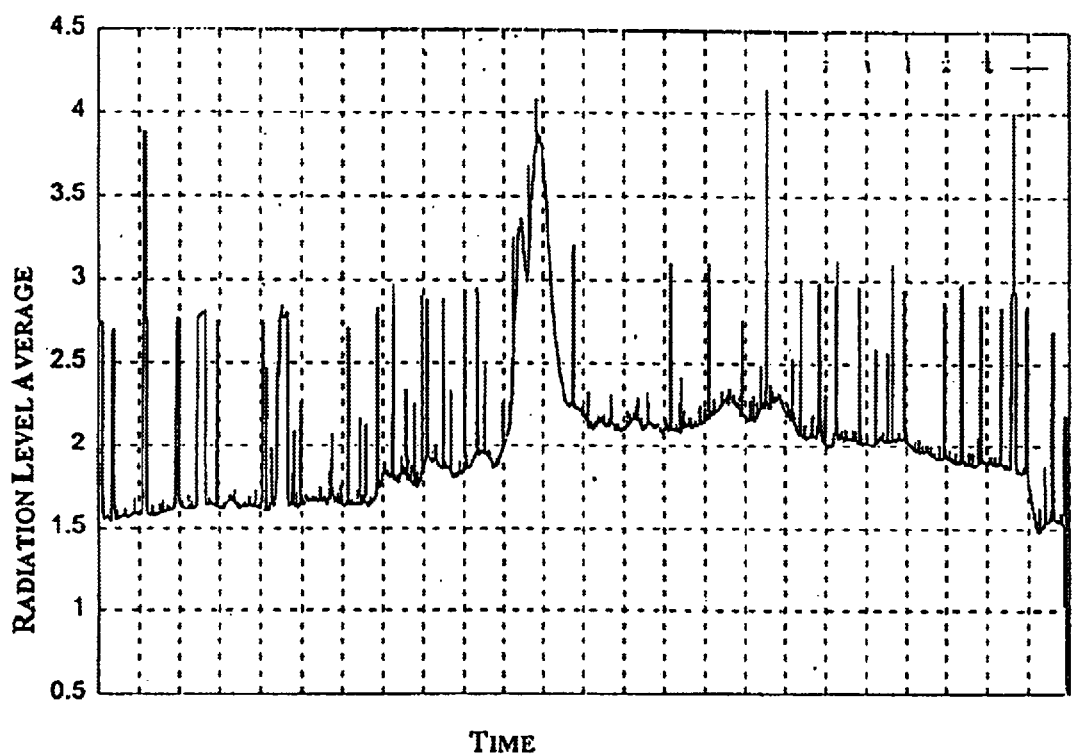
FIG. 7 is a diagrammatic readout showing the average radiation level reading for each corresponding time interval, taken from the first, second, and third radiation detectors of the radiation monitoring system of the present invention.

FIGS. 1–7 illustrate the new and improved radiation monitoring system 10 of the present invention. FIGS. 1 and 2 depict the system 10 of the invention in use. FIGS. 3–7 show diagrammatic graphical examples of readings taken from the system and the unique manner in which they are summed and averaged in order to detect radiation emitting objects moving at high speeds in light of background levels of radiation. Referring to FIGS. 1 and 2, the radiation monitoring system 10 for detecting moving radioactive sources is shown. It will be appreciated that the moving source may be a vehicle 12 such as a car, truck or train, or an object such as scrap moving along a conveyor belt, baggage or luggage moving through an airport luggage distribution system, or parcels and packages being routed at a mail distribution site even though the drawings and description following are specific to a vehicle.

A vehicle 12 is shown traveling in the direction of the arrow 14. The vehicle is scanned for ionizing radioactivity as it passes the radiation monitoring system which comprises a series of at least two radiation detectors 16 set up along the side of the path 18 of the vehicle 12, and at least one position sensor 20 mounted immediately upstream of each detector 16 relative to the direction of travel. The detectors 16 and the position sensors 20 are each operatively connected to a processor 22 located locally or at a central location 24.

The position sensors 20 detect the presence of an object or vehicle 12 that is about to enter or leave the scanning zone 26 in front of each radiation detector 16. In a specific embodiment, each detector 16 is constantly taking radiation level readings from its particular scanning zone both when an object 12 is in its scanning zone 26 and otherwise. The readings are recorded on the basis of time, and when no vehicle 12 is in the zone 26 of a particular detector, the detector is reading background radiation levels. When a position sensor 20 detects the presence of a vehicle 12 approaching the scanning zone of a detector, detector 16 readings are time stamped so that as each detector 16 takes a reading of the vehicle 12 moving through the scanning zone for each detector 26, the relative before and after background radiation readings may be properly corresponded to the readings taken from the particular vehicle 12.

The readings taken by each detector 16 while the vehicle 12 is moving through that detector's scanning zone 26 are summed with the readings taken by the other detectors 16 while the vehicle 12 is moving through their scanning zones 26 and the result is divided by the number of detectors 16. The average before and after background radiation reading may be properly corresponded to the average of the readings taken from the particular vehicle 12 by each radiation detector 16.

In other specific embodiments, a particular detector 16 only takes readings from its scanning zone 26 when the position sensors 20 detect a vehicle 12 approaching that scanning zone 26 and discontinues taking readings when the position sensor or sensors 20 no longer detect that the vehicle 12 is in its scanning zone 26. Such readings are summed, averaged and compared to the average background radiation in a similar manner. In such embodiments, the readings taken by each detector 16 are summed with the readings taken by the other detectors 16 and averaged. The average is compared with the background radiation.

In yet other specific embodiments, there are two sensors 20 corresponding to each detector 16, one immediately upstream relative to the direction of travel of the vehicle 12, and one immediately downstream from the detector 16 as shown in FIGS. 1 and 2. The detector 16 takes radiation level readings from its scanning zone 26 when the upstream sensor 20 detects a vehicle 12 and discontinues taking readings when the downstream sensor 20 no longer detects the presence of the vehicle 12. In this way, the detectors 16 take radiation level readings from their particular scanning zone 26 at all times any portion of an object or vehicle 12 is in that detector's scanning zone 26.

In a specific embodiment, the detectors 16 take readings from their particular scanning zone 26 on the basis of time. At least two adjacent detectors 16 in series are used in the new and improved radiation monitoring system 10 of the invention. When the upstream sensor 20 for the first detector 16 detects the presence of a vehicle 12 approaching the first scanning zone 26, the first detector 16 takes radiation level readings from the first scanning zone 26. The moment of vehicle 12 detection constitutes time-zero. Level readings are then charted according to time after time-zero in seconds, increments of seconds, or other time units based on seconds. The stop-time is determined on the basis of the upstream sensor 20 no longer detecting the presence of a vehicle 12. In the event a downstream sensor 20 is used with each detector 16, the stop-time is determined when both the upstream and the downstream sensors 20 no longer detect the presence of the vehicle 12. A second radiation detector 16 with its corresponding sensors to establish time-zero and stop-time takes level readings in the same way. Level readings from each detector 16 are transmitted to the processor 22. The detectors 16 are set up adjacent one another and spaced apart a distance up to the maximum distance for which a constant vehicle velocity across the front of each detector 16 may be assumed. As a result, the time of detection for each detector 16, i.e. the amount of time between time-zero and stop-time, is exactly or nearly the same.

The level reading from each detector 16 corresponding to each particular increment of time between time-zero and the stop-time are summed for each increment of time. For example, the level readings at time-zero of each detector 16 are summed, the level readings at time-zero-plus-1-unit of each detector 16 are summed, and so on to the level readings at the stop-time of each detector 16. The increments of time should match up between the first and second detectors 16. The level reading for each increment of time is then averaged by dividing the sum of level readings for that increment of time by the total number of detectors 16 utilized in the system 10. In the foregoing embodiment, that number is 2. In other specific embodiments, as shown in FIGS. 1 and 2, at least 3 detectors 16 in series are utilized in the system 10. In all embodiments, the divisor for calculation of the average level reading at each increment is the number of detectors 16 used. No matter how many detectors 16 are used (there must be two or more) the readings are summed and then averaged by the number of detectors 16 in a similar manner. The results are compared with the average background count.

In another specific preferred embodiment, there are position sensors 20 placed along the length of each radiation detector 16, either before or after the radiation detector 16. The detectors 16 take readings from their individual scanning zones 26 on the basis of the position of the vehicle or object 12 as detected by the position sensors 20. At least two adjacent detectors 16 in series are used in the radiation monitoring system 10. When the upstream position sensor 20 for the first detector 16 detects the presence of a vehicle 12 approaching the first scanning zone 26, the first radiation detector 16 takes radiation level readings from the first scanning zone 26. The entry of the vehicle 12 into the scanning zone is reading one. Readings are then charted according to movement of the vehicle 12 across the detector 16 as such motion is determined by the position sensor 20. A second radiation detector 16 with its corresponding position sensors 20 to establish the movement of the vehicle 12 across the scanning area of the detector 16 takes readings in the same way. Readings from each radiation detector 16 are transmitted to the processor 22. The readings from each detector 16 corresponding to each particular position of the vehicle 12 across the detector 16 taking the reading are summed. For example, the readings taken by the different detectors 16 when the vehicle just enters the scanning zone 26 of the detector taking the readings (reading one of each detector) are summed, the readings taken when the vehicle 12 is an inch inside the scanning area 26 of each detector are summed, and so on, up to the readings taken by each detector 16 when the vehicle just exits the scanning area 26 of each detector 16. The summed readings for each position of the vehicle 12 relative to the detector taking the reading is then averaged by dividing the sum of the readings for a relative position by the total number of detectors 16 utilized in the system 10. In the foregoing embodiment, that number is 2. In other specific embodiments, as shown in FIGS. 1 and 2, at least 3, or more, detectors 16 in series are utilized in the system 10. In all embodiments, the divisor for calculation of the average level reading at each increment is always the number of detectors 16. No matter how many detectors 16 are used (there must be two or more) the readings for each relative position of the vehicle 12 in relation to the detector 16 in whose scanning zone 26 the vehicle 12 is are summed and then averaged by the number of detectors 16 in a similar manner. The results are compared with the average background count.

In another specific embodiment, each radiation detector 16, instead of taking readings of radiation levels, emits an electrical pulse when a photon, wave or other particle of ionizing radiation strikes the detector 16. The total count of pulses resulting from ionizing radiation striking each detector 16 when the vehicle 12 is within that detector's scanning zone 26 is summed and averaged by dividing the sum by the total number of detectors 16 used in the system 10. The averaged result is compared with an average of the count of pulses resulting from background radiation when no vehicle 12 is in the scanning zone 26 of any detector 16 during the same amount of time. Such averages may be calculated from pulse counts taken periodically throughout each day and averaged by dividing by the total number of counts for similar time durations taken.

The radiation detectors 16 utilized in the radiation monitoring system 10 comprise any ionizing radiation detector 16 on which ionizing radiation can impinge to induce a detector output related either to the level of such impinging ionizing radiation or to a pulse count for each time a particle of ionizing radiation strikes the detector 16. Each radiation detector 16 is operative to provide an output indicative of background radiation as well as radiation from a vehicle 12 passing through the scanning zone 26 of the particular detector 16. An example of a radiation detector 16 is a large volume plastic scintillator coupled to a low noise photomultiplier tube contained in a weatherproof housing, including other signal processing electronics associated with the photomultiplier tube and transmission of data to the processor. Plastic scintillators must be shielded by lead on all sides except the side which serves as the radiation entrance window immediately in front of the detector facing the scanning zone. Exemplary radiation detectors 16 are sold by Bicron Industrial Ceramics Corporation of Newbury, Ohio, U.S.A.

In other specific embodiments, the position sensors may be light beams, infrared beams, magnetic detectors, proximity sensors, or any other detectors whose time stamped data will enable the processor to determine the presence of an object or vehicle as well as calculate an approximate speed of motion.

The radiation detectors 16 may be along one side of the path 18 of travel of the object 12, as is shown in FIGS. 1 and 2. In other specific embodiments, the radiation detectors 16 may be located above the path 18 of travel of the object 12, such as on the underside of an overpass or tunnel for a roadway or a railroad track. In other specific embodiments, the radiation detectors 16 may be located below the object, embedded in the ground, such as between rail car rails, or below a conveyor belt. In yet other specific embodiments, radiation detectors 16 may be placed in any combination of the foregoing locations. The sensors 20 may be located proximate to each radiation detector 16 or in any of the side, above, or below positions regardless of whether the radiation detector 16 to which each sensor 20 corresponds is located similarly.

In a specific embodiment, each sensor 20 and radiation detector 16 is operatively connected to a processor 22. The operative connection may be achieved by common data transmission lines, such as means for electronic communication including phone lines, coaxial cable and fiber optic cable, or any other adequate operative connection known to those skilled in the art. In another specific embodiment, the operative connection is achieved by broadcast transmission.

The processor 22 may be located generally proximate to the radiation monitoring system 10 or at a central location 24. The processor 22 is capable of performing data manipulation, such as summing and averaging, of the data produced by the radiation detectors 16 and sensors 20. For a processor located generally proximate to the system, the processor 22 also transmits the resulting information and other information gleaned from the sensors 20, detectors 16 or otherwise, to a central location for analysis and determination of whether an abnormally high level of ionizing radiation has been detected from a particular object 12. When the processor 22 is generally proximate to the system, the information generated and contained in the processor 22 is transmitted to the central location 24 using operative connections, such as the data transmission lines or broadcast transmission techniques as above-described. In other specific embodiments, the processor 22 is located at the central location where analysis of the resulting information is performed.

In the event that abnormally high levels of ionizing radiation are detected in a particular object 12, a visual identification means 28 is operatively connected to the radiation monitoring system 10. In a specific embodiment, such visual identification means 28 is incorporated with one or more of the sensors 20 and operatively connected to the processor 22. In other specific embodiments, the visual identification system 28 is separately incorporated with the radiation monitoring system 10 and is operatively connected to the processor 22 separately in a manner similar to the operative connection of the sensors 20 and radiation detectors 16 to the processor 22. In yet other specific embodiments, the visual identification system 28 comprises a digital camera or video camera triggered by the detection of the presence of a vehicle 12 by one or more of the sensors 20. In another specific embodiment, the visual identification system 28 comprises a web-cam temporally coordinated with the sensors 20, radiation detectors 16 and the processor 22 such that readings taken by the detectors from the scanning zone 26 and detection of the presence of a vehicle 12 by the sensors 20 are temporally corresponded and coordinated with the visual images taken by the visual identification system 28.

The new and improved radiation monitoring system of the present invention provides a new and improved radiation monitoring system capable of regularly taking accurate readings from vehicles moving at a wide range of speeds including top speeds on highways, interstates and thoroughfares. It also can provide visual identification of a vehicle corresponding to the detector reading therefrom. Furthermore, the new and improved radiation monitoring system of the present invention is inconspicuous at least until such time as detection and identification may be made.

The new and improved radiation monitoring system of the present invention uses a simple yet unique method for arriving at accurate radiation detection results despite sensitivity considerations caused by readings generated from naturally occurring radioactive material and other background radiation sources. It additionally uses the background readings detected in a way that affirmatively differentiates high level readings from materials carried by a vehicle traveling at high speed. Further, it can monitor radiation with a high degree of sensitivity without concern regarding anomalous background sources.

Finally, the present invention provides a new and improved radiation monitoring system having all of the above identified features.

While a specific embodiment of the invention has been shown and described herein for purposes of illustration, the protection offered by any patent which may issue upon this application is not strictly limited to the disclosed embodiment; but rather extends to all structures and arrangements which fall fairly within the scope of the claims which are appended hereto.

What is claimed is:

1. A radiation monitoring system for monitoring objects traveling along a pathway at any speed comprising a plurality of radiation detectors, each having a front facing scanning zone, a plurality of position sensors, at least one of said sensors corresponding to each of said radiation detectors, and a processor, each of said radiation detectors being capable of detecting various levels of ionizing radiation emitted from objects in said scanning zone, said radiation detectors each being operatively connected to said processor and being positioned along said pathway in a spaced apart relationship such that said object passes through said scanning zone for each of said radiation detectors one at a time, in series, at least one of said position sensors being positioned in relation to each said scanning zone to detect the presence of an object entering and leaving said scanning zone, said sensors each being operatively connected to said processor, each of said radiation detectors monitoring the level of ionizing radiation over time both when no object is in said scanning zone and when an object is in said scanning zone, said processor receiving data from each said radiation detector and from each said sensor, said processor being used to calculate the sums of the levels of ionizing radiation detected by each radiation detector at corresponding increments of the time duration of the presence of the same object in said scanning zone for each said radiation detector as detected by said sensors corresponding thereto, and to calculate averages for each said sum by dividing said sum by the number of said radiation detectors used in said system; wherein said average indicates average levels of radiation detected from said object at each said increment of time, and said average levels are distinguished from background radiation levels to identify those objects emitting radiation.

2. The radiation monitoring system of claim 1 wherein two radiation detectors are used.

3. The radiation monitoring system of claim 1 wherein at least three radiation detectors are used.

4. The radiation monitoring system of claim 1 wherein one of said position sensors is positioned upstream from each of said radiation detector relative to the direction of travel of said object.

5. The radiation monitoring system of claim 4 wherein one of said position sensors is positioned downstream each said radiation detector relative to the direction of travel of said object.

6. The radiation monitoring system of claim 1 wherein there are a plurality of position sensors arrayed along the length of each detector, in the direction of the travel of said object.

7. The radiation monitoring system of claim 6 wherein said object is a vehicle selected from the group of vehicles consisting of a car, a truck, a van and a railroad train car.

8. The radiation monitoring system of claim 1 wherein said radiation detectors comprise plastic scintillator panels coupled to a low noise photomultiplier tube having associated therewith signal processing electronics, said panels and photomultiplier tube and electronics being contained in a weatherproof housing, said housing having lead siding on all sides except the side facing said scanning zone.

9. The radiation monitoring system of claim 1 wherein said position sensors are selected from the group of sensors consisting of light beams, infra-red beams, magnetic detectors, and proximity sensors.

10. The radiation monitoring system of claim 1 further comprising a visual identification system operatively connected to said processor.

11. The radiation monitoring system of claim 10 wherein said visual identification system is operatively connected to at least one of said position sensors.

12. The radiation monitoring system of claim 1 wherein said radiation detectors are positioned along at least one lateral side of said pathway to define a lateral scanning zone.

13. The radiation monitoring system of claim 1 wherein said radiation detectors are positioned above said pathway to define a scanning zone between said front of each said radiation detector and the surface of said pathway.

14. The radiation monitoring system of claim 1 wherein said radiation detectors are embedded in said pathway to define a scanning zone extending upwardly from the surface of said pathway.

15. The radiation monitoring system of claim 1 wherein said processors are located generally proximate said radiation detectors, said processor being operatively connected to a central location for delivering data resulting from said detected radiation levels and said sums and said averages to said central location for analysis.

16. The radiation monitoring system of claim 1 wherein said processor is located at a central location for analysis of monitored radiation levels and said sums and said averages.

17. A method for monitoring objects traveling along a pathway at any speed, comprising the steps of passing an object through a first scanning zone in front of a first radiation detector, passing said object through a second scanning zone in front of a second radiation detector, said first and second radiation detectors being exposed to background radiation when no object is in either said first scanning zone or said second scanning zone, respectively, said first and second radiation detectors being operatively connected to a processor, using a plurality of sensors to detect the presence of said object in each of said first and second scanning zones, said sensors being operatively connected to said processor, said processor recording first and second time durations of said object in said first and second scanning zones, respectively, using said first and second radiation detectors to detect levels of ionizing radiation emitted from said object within said first and second scanning zones, respectively, corresponding to said first and second time durations, using said processor to calculate sums of the level of ionizing radiation detected from said object at corresponding increments of said first and second time durations, and using said processor to average said sums by dividing said sums by two.

18. The method of claim 17 wherein each step further includes the use of a plurality of radiation detectors, a plurality of scanning zones, and a plurality of time durations as appropriate, and wherein using said processor to average said sums step is achieved by dividing said sums by the number of detectors used.

19. The method of claim 17 wherein the pathway is a railway, a street, a road, a highway, a thoroughfare or a conveyor belt.

20. The method of claim 17 wherein the ionizing radiation is radiation that has passed through or scattered from said object.

21. The method of claim 20 wherein the ionizing radiation is deliberately passed through or scattered from said object in order to determine its composition.

* * * * *